United States Patent
Yoshimura et al.

(10) Patent No.: US 6,458,863 B1
(45) Date of Patent: Oct. 1, 2002

(54) VIBRATION DAMPING, RESINOUS, OPEN CELL CELLULAR BODIES

(75) Inventors: Koji Yoshimura; Shusaku Maruo, both of Hyogo (JP)

(73) Assignee: Sanwa Kako Company Limited, Kyoto (JP)

( * ) Notice: Subject to any disclaimer, the term of this patent is extended or adjusted under 35 U.S.C. 154(b) by 0 days.

(21) Appl. No.: 09/458,126

(22) Filed: Dec. 9, 1999

(51) Int. Cl.$^7$ .................................................. C08J 9/00
(52) U.S. Cl. ......................... 521/139; 521/94; 521/134; 521/140; 521/150
(58) Field of Search .................. 521/134, 139, 521/140, 150, 94; 525/88; 428/304.4

(56) References Cited

U.S. PATENT DOCUMENTS

| | | | |
|---|---|---|---|
| 4,734,323 A | * 3/1988 | Sato et al. | 428/319.7 |
| 5,635,562 A | * 6/1997 | Malcolm | 521/79 |
| 5,942,569 A | * 8/1999 | Simmons et al. | 264/211.14 |
| 6,106,952 A | * 8/2000 | Yamashita et al. | 264/241 |
| 6,110,985 A | * 8/2000 | Wheeler | 321/139 |

FOREIGN PATENT DOCUMENTS

| | | | |
|---|---|---|---|
| GB | 2 259 131 | * | 3/1993 |
| JP | 62-19294 B2 | | 4/1987 |
| JP | 1-44499 B2 | | 9/1989 |
| JP | 5-8209 B2 | | 2/1993 |
| JP | 7-25863 B2 | | 3/1995 |
| JP | 7-62130 A | | 3/1995 |
| JP | 8-208869 A | | 8/1996 |

* cited by examiner

*Primary Examiner*—Allan R. Kuhns
(74) *Attorney, Agent, or Firm*—Frishauf, Holtz, Goodman & Chick, P.C.

(57) ABSTRACT

A vibration damping, resinous, open cell cellular body is disclosed. The body has a base material thereof which consists essentially of a mixture of a tri-block copolymer as a combination of polystyrene and vinyl-polyisoprene and an ethylene series resin. In a method of manufacture, the mixture is blended and kneaded with a foaming agent and a crosslinking agent to form a foamable and crosslinkable composition. The composition is heated in a non-airtight mold to foam, thereby forming a cellular body with cells therein. The cellular body is then mechanically deformed to cause cells therein to be interconnected, thereby producing the open cell cellular body.

6 Claims, No Drawings

VIBRATION DAMPING, RESINOUS, OPEN CELL CELLULAR BODIES

TECHNICAL FIELD

The present invention relates to a shock absorbing, vibration damping, resinous (resin made or containing), open cell cellular body for use in forming floor coverings, sports goods such as sport shoes and pads, and so forth.

BACKGROUND ART

A vibration damping cellular body has been used, utilizing its being soft and having good vibration damping capacity, in sports goods such as sport shoes and pads, floor coverings, daily necessaries and so on in order to increase their shock and vibration absorption properties. A vibration damping property of polymer utilizes the phenomenon that the a polymer exhibits a viscoelastic behavior in the vicinity of its glass transition temperature and in the vicinity of its secondary transition temperature lower than that temperature, increasing greater in its internal friction and, hence its vibration damping capacity.

Polyurethane foam vibration damping materials have so far been made available. For example, a vibration damping material for use in ceiling, floor and so on, that is designed to possess both vibration damping and sound absorption performance by using a predetermined amount of a foam regulator in making a soft polyurethane foam has been proposed (Japanese patent publication No. H05-8209 B). A sound absorbing and vibration damping foam material that is sought to be obtained by foaming an organic polyisocyanate and a particular type of polyol in the presence of a foaming agent, a catalyst, a foam regulator and a fluid having a plasticizing effect has also been proposed (Japanese patent publication No. H07-25863 B).

While these polyurethane foam vibration damping materials are sought to excel in vibration damping properties, they are found to be defective because of their poor resistances to climate or weather and water.

Rubber or elastomer vibration damping foams have also been proposed. For example, 1,2-polybutadiene foams that excel in vibration damping properties, are slow in recovering speed to excel in shock absorbing characteristics and excel in mutual solubility with a thermoplastic resin are sought to be produced by a certain method of manufacture (JP No. H07-62130 A). Further, a vibration damping, resinous foam has also been proposed that is obtainable by crosslinking and foaming a molded mixture of 1,2-polybutadiene having vibration damping capacity and vinyl combined polyisoprene polystyrene block copolymer also having damping capacity (Japanese patent publication No. H08-208869 A).

These conventional 1,2-polybutadiene series foams are closed-cell foams, however, and fail to be an open cell cellular body and may thus have only limited applications. Further, the presence of double bonded carbon atoms of a vinyl radical or a group on the side chains of 1,2-polybutadiene in such compositions makes crosslinking between the side chains together and between the main chain and side chains liable to occur. The compositions thus are defective because they cure rapidly and become deficient in stretchability and flexibility,

SUMMARY OF TEE INVENTION

It is accordingly an object of the present invention to provide a vibration damping, resinous, open cell cellular body that has excellent resistance to climate or weather, is waterproof, and has the propertise of stretchability and flexibility.

Another object of the present invention is to provide a method of making a vibration damping, resinous, open cell cellular body that has properties as described above.

In accordance with the present invention, in a first aspect thereof there is provided a vibration damping, resinous, open cell cellular body with a base material thereof which consists essentially of a mixture of a tri-block copolymer as a combination of polystyrene and vinyl-polyisoprene, and an ethylene series resin.

According to a specific feature of the present invention, it is preferred that a vibration damping, resinous, open cell cellular body as described above, the mixture contain 30 to 95 parts by weight of a tri-block copolymer as a combination of polystyrene and vinyl-polyisoprene, and 70 to 5 parts by weight of an ethylene series resin.

It has been found that the tri-block copolymer described above if contained in less than 30 parts by weight tends to reduce the vibration damping capacity of the cellular body and if contained in more than 95 parts by weight tends to make the cellular body less satisfactory to achieve kneading of the mixture, especially homogeneously.

In accordance with the present invention, in a second aspect thereof there is also provided a method of making a vibration damping, resinous, open cell cellular body, comprising the steps of: blending and kneading with a foaming agent and a crosslinking agent, a mixture of a tri-block copolymer as a combination of polystyrene and vinyl-polyisoprene and an ethylene series resin to form a foamable and crosslinkable composition; heating the composition in a non-airtight mold to permit it to foam, thereby forming a cellular body; and mechanically deforming the cellular body to cause the cells in the body to be interconnected, thereby producing the open cell cellular body.

According to a specific feature of the present invention, it is preferred that in a method of making a vibration damping, resinous, open cell body as described above the mixture contain 30 to 95 parts by weight of a tri-block copolymer as a combination of polystyrene and vinyl-polyisoprene, and 70 to 5 parts by weight of an ethylene series resin.

A tri-block copolymer as a combination of polystyrene and vinyl-polyisoprene as in the present invention has a glass transition temperature (Tg, or absorption of tan δ) in a room temperature range and exhibits high vibration damping performance in such a temperature range.

Thus, according to the present invention in which a tri-block copolymer as a combination of polystyrene and vinyl-polyisoprene is used that has a glass transition temperature (Tg, or absorption of tan δ) in a room temperature range and exhibits high vibration damping performance in such a temperature range, it has been found that a resinous, open cell cellular obtained exhibits high vibration damping performance and shape recoverability and are excellent in vibration damping capacity and also in stretchability, flexibility, climate or weather resistance, and has desirable waterproof and sound insulating properties and is therefore useful for applications, e. g., in forming sports goods such as sport shoes, and also floor coverings.

It has also been found that the tri-block copolymer for use in the present invention should preferably have hydrogen added In its vinyl-polyisoprene phase to provide an open cell cellular body having better resistance to climate or weather.

It has been found that an ethylene series resin as used in the present invention serves to bind the components of a tri-block copolymer together and also to impart to the composition the ability to break or destruct a cell membrane in a cellular structure. While the ethylene series resin may be a low density polyethylene processed under a high pressure, a low density processed under a low pressure, a medium density polyethylene, a high density polyethylene, ethylene-vinyl acetate copolymer, or a polyethylene series resin polymerized by using metallocene catalyst and so forth, it has been found that ethylene-vinyl acetate copolymer is preferred to provide better cellular interconnection and shape recoverability.

In the method of making a vibration damping, resinous, open cell cellular body according to the present invention, as described above a base material resin is blended with and kneaded together with a foaming agent and a crosslinking agent to form a foamable and crosslinkable composition, which is then heated and thereby foamed to produce a cellular body. Then, by mechanically deforming the cellular body, the cells therein are allowed to inter-communicate. It may be noted that a similar method is described in JP No. S62-19294 B and JP No. H01-44499 B. In the methods described in these prior art literature as well, a foamable and crosslinkable composition is molded as heated into a predetermined shape, and the molded body is then heated under a normal pressure in a non-air tight die or mold to permit decomposition of the crosslinking and foaming agents to proceed concurrently to produce a cellular body. Then, by mechanically deforming the cellular body, the cells therein are allowed to inter-communicate. However, the use as its base resin material of a mixture of a tri-block copolymer and an ethylene series resin sharply distinguishes an open cell cellular body according to the present invention, with superior vibration damping properties, from those prior art products.

These and other features, objects and advantages will be understood and become more readily apparent to those of ordinary skill in the art from the following detailed description of the preferred embodiments.

BEST MODES FOR CARRYING OUT THE INVENTION

Hereinafter, suitable embodiments as presently preferred of the present invention with respect to a method of making vibration damping, resinous, open cell cellular bodies are set out.

A mixture of a tri-block copolymer as a combination of polystyrene and vinyl-polyisoprene and an ethylene series resin is blended with a forming agent and a crosslinking agent and, if desired, also with a forming auxiliary agent, a filler, a pigment and so forth, and the blend is kneaded together or homogeneously, using a heated mixing roll, pressure type kneader, extruder or the like.

A crosslinking agent referred to herein for use in the present invention is a free radical emitting organic peroxide that is decomposed in a resin by heating at a temperature equal to or higher than a temperature at which the resin becomes flowable, and that then produces free radicals to give rise to a crosslinking between or within molecules thereof. Such organic peroxides include, e. g., dicumyl peroxide; 1,1-ditertiarybutylperoxy-3,3,5-trimethylcyclohexane, 2,5-dimethyl-2,5-ditertiarybutylperoxyhexane; 2,5-dimethyl-2,5-ditertiarybutylperoxyhexyne; α,α-ditertiarybutylperoxyisopropylbenzene; tertiarybutylperoxyketone; tertiarybutylperoxybenzoate, and a particular choice must be made to be the most suited to a particular resin used.

A foaming agent referred to herein for use in the present invention is a chemical foaming agent that is decomposed at a temperature equal to or higher than the melting temperature of a polyethylene series resin used therewith. Such agents include, e. g., azo series compounds such as azodicarbonamide and bariumazodicarboxylate; nitroso series compounds such as dinitrosopentamethylenetetramine and trinitrotrimethyltriamine; hydrazid series compounds such as p,p'-oxybisbenzenesulfonylhydrazid; and sulfonylsemicarbazide series compounds such as p,p'- oxybisbenzensulfonylsemicarbazide and toluenesulfonylsemicarbazide.

In the present invention a foaming auxiliary agent that can be added to the mixture may be selected to be suitable for different kinds of foaming agents selected. Such foaming auxiliary agent include, e. g., compounds in which urea is a main component, metal oxides, e. g., zinc oxide or lead oxide, compounds in which salicylic acid or stearic acid is a main component, i. e., higher fatty acids or their metallic oxides.

In the present invention, in order to improve the properties or to reduce the cost of a composition used, a formulating ingredient (filler) that does not much adversely affect cross linking may be added to the mixture. Such formulating ingredients include, e. g., a metal oxide such as zinc oxide, titanium oxide, calcium oxide, magnesium oxide or silicon oxide, carbonates such as magnesium carbonate or calcium carbonate, a fibrous filler material, a dye stuff, a pigment, a fluorescent material and a rubber compounding ingredient of common use, and such an ingredient or ingredients may be chosen as suitable and added in a proportion or proportions as needed.

A foamable and crosslinkable composition so blended and kneaded as described above is loaded into a closed die or mold and pressure molded therein under pressure by a press while being heated at an optimum temperature between 115° C. and 165° C., preferably between 120° C. and 150° C. depending on kinds of the crosslinking agent and the resin used. In this heating and pressure molding step, the important and required condition is that the foamable crosslinkable composition be maintained at a gelling proportion of preferably nil in order for an open cell cellular body to be obtained with a proportion of interconnected cells in the body being 100% or nearly 100%. By the term "gelling proportion" is meant the ratio by weight of a sample before extraction and the sample after extraction where the sample is introduced into a wire mesh of 200 meshes and extracted using a Soxhlet extractor under reflux of a trichloroethylne solvent for a period of 24 hours, and then measured. By the way, while in the above heating and pressure molding step an extremely small amount of the foaming agent may initially decompose and expand its volume by about twice when the molded composition is removed from the mold, it should be noted that such expansion of a very minute proportion is far from the concept of "foaming" and in no way hinder the process of the present invention.

The molded composition so formed as described above is then heated under a normal pressure to allow decomposition of the crosslinking agent and the foaming agent to proceed concurrently. The formed composition in this foaming and crosslinking step is received in a non-airtight, thus non-hermetically sealed die or mold having a given cross sectional shape and dimension, and is heated therein indirectly by heating a metal plate of the die or mold. Methods for such indirect heating include heating by a heater disposed in close contact with an external surface of the metal plate, and a method of providing the metal plate with flow channels for a heat medium and thus heating the metal with a steam or heated oil in a jacketed heating system. Alternatively, the intermediate foamed body may be accepted in a non-air tight die or mold of open and close type, and directly heated in a metal bath using a Rose alloy or Wood's metal or in an oil bath, in a salt bath using one or more, or two or more molten salts such as sodium nitrate, potassium nitrate and potassium nitrite, or in a nitrogen gas stream, or as covered with an expandable or extendable iron plate or the like. High frequency heating may also be employed. The body of composition so heated as described above is allowed to cool to yield a cellular body. Depending on a particular kind of polyolefin used, a heating temperature is set in a range between 140° C. and 210° C., preferably between 150° C. and 180° C. The period of heating ranges preferably between 30 and 300 minutes, more preferably between 100 and 200 minutes. A cellular body is thus provided having a cell membrane that can be readily destructed by mechanical deformation and yet having a degree of crosslinking comparable with that of the conventional cellular body (with a gelling proportion of about 90%

A cellular body so formed as described above (with a so-called close-cell structure) is then subjected to compressive deformation by a pair of even speed rolls or the like that permit the cell membrane to be destructed and the cells to be made interconnected and thus an open cell cellular body is obtained. The two even speed rolls may have a very large number of needles arranged on their surfaces, or the two even speed rolls may have on their front and/or rear sides rolls provided with such a large number of needles, to facilitate interconnecting cells in the cellular body.

An open cell cellular body obtained by the method described above was found to have a proportion of interconnected cells reaching 100% or nearly 100%, when measured by an air comparison type density meter or aerometer, Model 1000 (made by Tokyo Science K. K.) according to ASTM D 2856.

The impact resilience or repulsive elasticity of a vibration damping, resin made, open cell cellular body was measured by a testing method prescribed by JIS (Japan Industrial Standard) K 6401. In specific terms, it is represented by a distance of repulsion divided by a distance of fall (percentage) for a gravity fall of a ball of ⅝ in. from the height of 460 mm.

An explanation will now be given of specific examples that further implement the present invention.

EXAMPLE 1

A mixed composition is prepared that has 70 parts by weight of a tri-block copolymer (trade name "HYBRAR HVS 3" made by K. K. KURARE, which has a styrene content of 20%, a vinyl combination of 55% and a glass transition temperature of −19° C. ) as a combination of a polystyrene and vinylpolyisoprene, 30 parts by weight of ethylene-vinyl acetate copolymer (trade name "NOVATEC EVA LV-540" made by Nippon POLYCHEM K. K., which has a vinyl acetate content of 20%, an MFR of 2.5 g/10 minutes, and a density of 0.942 g/cm$^3$), 18.0 parts by weight of azodicarbonamide, 0.8 part by weight of dicumyl peroxide, and 0.04 part by weight of active zinc white (zinc oxide). The mixed composition or mixture is blended and kneaded using a mixing roll having a temperature of 85° C. The kneaded mixture is then loaded or filled into a press die or mold (160×160×37 mm) heated at 140° C. and heated at the temperature under pressure for a period of 55 minutes to yield a formed or molded body of the composition. The formed body of composition is then accepted in a non-airtight die or mold of open and close type (500×500×100 mm) and heated therein in a jacketed system with a steam of a temperature of 170° C. for a period of 140 minutes, and thereafter allowed to cool and removed to yield a foamed or cellular body. The foamed or cellular body yielded is passed between a pair of even speed rolls spaced apart with a set distance of 20 mm, four times. This makes the cells in the cellular body interconnected. The cellular body with a skin and the cells so made interconnected has a size of 500× 500×100 mm. When the skin is removed, the hexahedral cellular body has a bulk density of 0.035 g/cm$^3$, a proportion of interconnected cells of 100% and a repulsive elasticity or impact resilience of 7.3%, showing that the body is excellent in vibration damping properties. A sheet prepared by slicing the hexahedral body to have a thickness of 5 mm shows that when decompressed after compression recovers its flat sheet form and is excellent in shape recoverability.

EXAMPLE 2

Example 1 is likewise carried out with the same composition except that the mixed composition is altered to have 50 parts by weight of the tri-block copolymer and 50 parts by weight of the ethylene-vinyl acetate copolymer, and using the same foaming conditions, to yield a vibration damping, resin made,. open cell cellular body. The cellular body yielded has a size of 500×500×100 mm and having a skin. The hexahedral body with the skin removed has a bulk density of 0.035 g/cm$^3$, a proportion of interconnected cells again reaching 100% and a repulsive elasticity of 14.2%, demonstrating that vibration damping properties are again excellent. An excellent shape recoverability is also shown.

COMPARATIVE EXAMPLE

In Example, the mixture of composition has the tri-block copolymer reduced to 0 part by weight and the ethylene-vinyl acetate copolymer increased to 100 parts by weight. The composition modified mixture is treated under the same conditions as those in Example 1. The resulting cellular body with a skin has a size of 500×50033 100 mm. After the skin is removed, the hexahedral body has a bulk density of 0.035 g/cm$^3$ and a proportion of interconnected cells of 100%, but has an repulsive elasticity as high as 28%, showing inferior vibration damping property. A sheet prepared by slicing the hexahedral cellular body to have a thickness of 5 mm in the same way in Example 1 shows that when decompressed after compression does not recovers its flat sheet form but remains deformed.

While the present invention has been described in terms of the presently preferred embodiments thereof, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A vibration damping, resinous, open cell cellular body having a base material thereof which consists essentially of a mixture of a tri-block copolymer as a combination of polystyrene and vinyl-polyisoprene, and an ethylene series resin, wherein the tri-block copolymer has hydrogen added in a vinyl-polyisoprene phase thereof.

2. The vibration damping, resinous, open cell cellular body as set forth in claim 1, wherein the ethylene series resin is an ethylene-vinyl acetate copolymer.

3. The vibration damping, resinous, open cell cellular body as set forth in claim 1, wherein the ethylene series resin is a polyethylene series resin polymerized in the presence of a metallocene catalyst.

4. A vibration damping, resinous, open cell cellular body having a base material thereof which consists essentially of a mixture of 30 to 95 parts by weight of a tri-block copolymer as a combination of polystyrene and vinyl-polyisoprene, and 70 to 5 parts by weight of an ethylene series resin, wherein the tri-block copolymer has hydrogen added in a vinyl-polyisoprene phase thereof.

5. The vibration damping, resinous, open cell cellular body as set forth in claim 4, wherein the ethylene series resin is an ethylene-vinyl acetate copolymer.

6. The vibration damping, resinous, open cell cellular body as set forth in claim 4, wherein the ethylene series resin is a polyethylene series resin polymerized in the presence of a metallocene catalyst.

* * * * *